Feb. 24, 1931. H. J. LONGLEY 1,794,080
MACHINE FOR BORING METAL
Filed Feb. 12, 1930 2 Sheets-Sheet 2
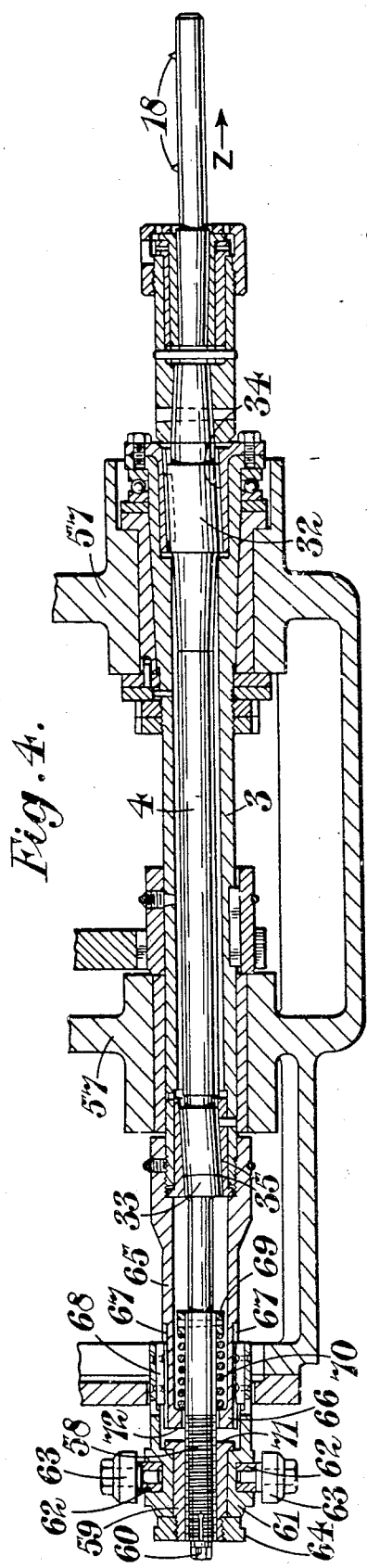
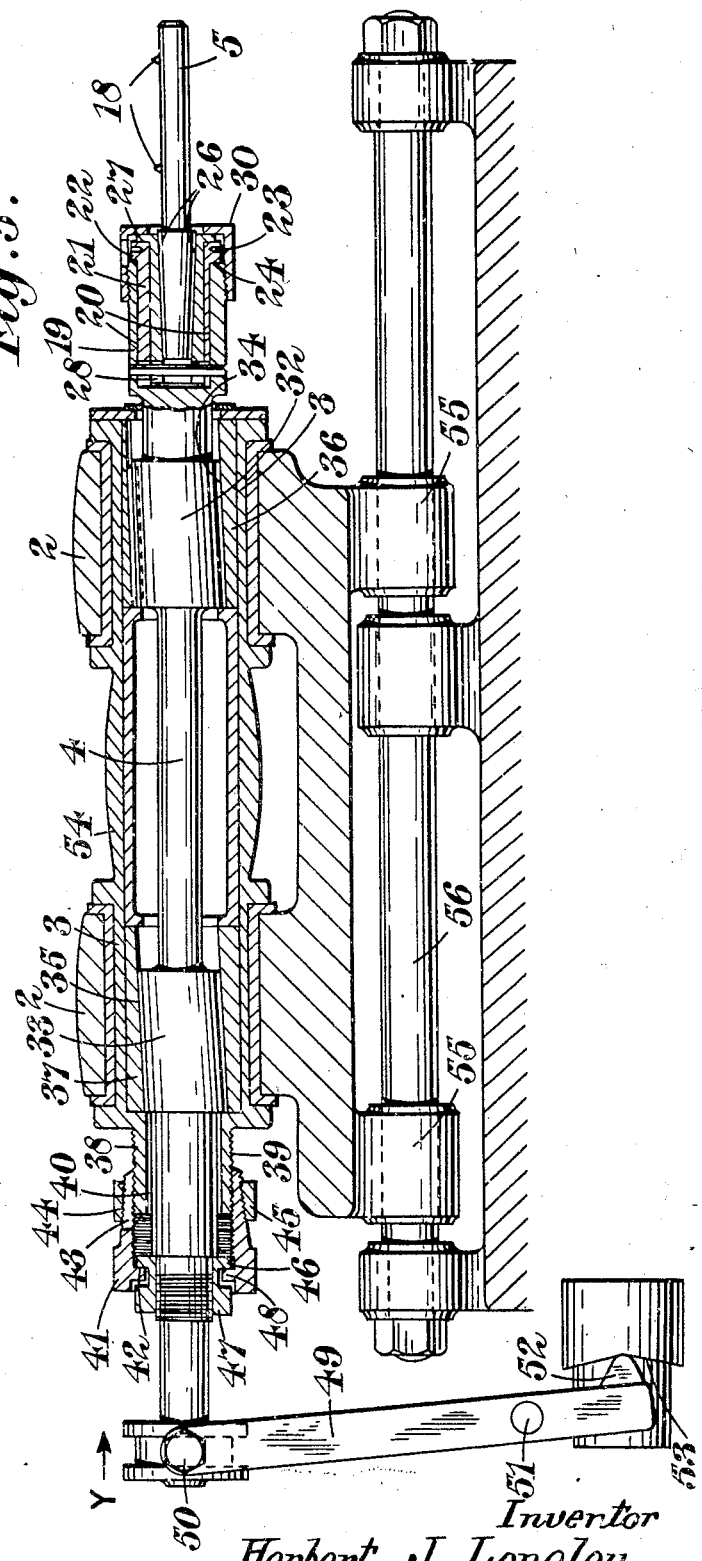
Inventor
Herbert J. Longley
by Mawhinney & Mawhinney
Attorneys.

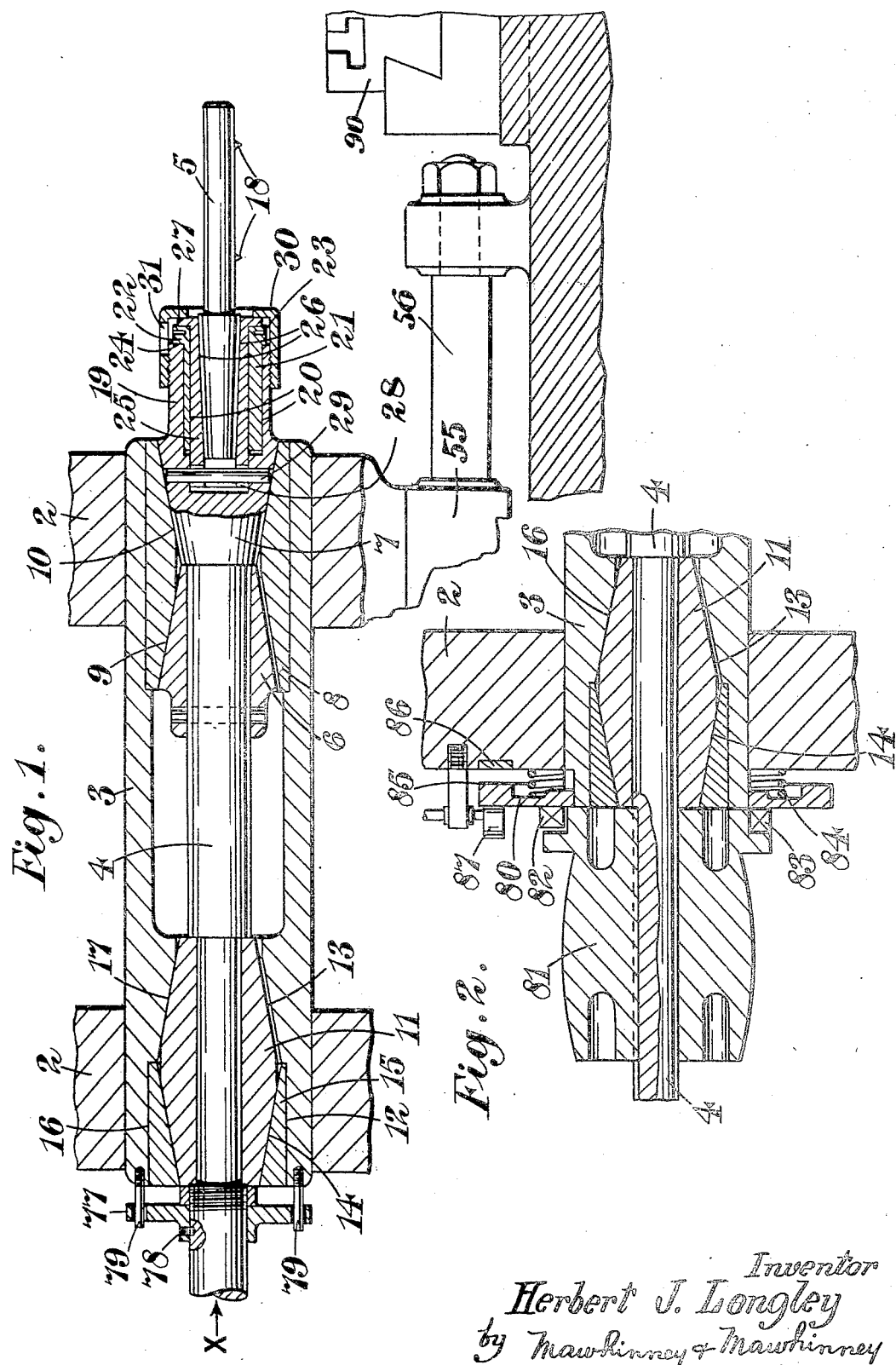

Patented Feb. 24, 1931

1,794,080

UNITED STATES PATENT OFFICE

HERBERT JOSEPH LONGLEY, OF TWICKENHAM, ENGLAND, ASSIGNOR TO AUTOMOTIVE ENGINEERING COMPANY, LIMITED, OF TWICKENHAM, ENGLAND

MACHINE FOR BORING METAL

Application filed February 12, 1930, Serial No. 427,847, and in Great Britain February 9, 1929.

This invention relates to machines for boring metal and particularly those embodying a tool having a radial cutter and has for an object to provide means whereby the tool may be set to effect a predetermined very fine cut and may be easily withdrawn from the work after making a cut without damaging the work.

In order that the tool may be set to make a predetermined cut it is preferable that the tool should make a single traverse in one direction only for one setting and a feature of the invention consists in providing wedge means for automatically effecting relative lateral movement between the work and the tool so as to separate them when relative axial movement is effected between them to bring them back to an initial cutting position.

A further feature of the invention consists in effecting an initial axial adjusting movement between the wedge faces by means of a micrometer mechanism. It will be appreciated that by making the angle of the wedge faces small, a comparatively large relative axial movement between the faces effects a small lateral movement of the tool and thus a delicate adjustment may be performed.

A still further feature of the invention consists in providing means for effecting relative traversing movement between the work and the adjusted wedge faces.

A still further feature of the invention consists in that the adjustment of said wedge faces is effected first by hand setting, for example, by the aforementioned micrometer, and subsequently to a constant amount by the means which effect the traverse movement between the work and the wedge faces.

According to a still further feature of the invention the wedge face on the machine is so mounted as to be rotatable about a fixed axis.

A still further feature of the invention consists in so forming and mounting said wedge faces as to permit relative rotation between them about an axis eccentric to said fixed axis and in providing means whereby either the wedge faces after adjustment may be locked and rotated together about said fixed axis or whereby the wedge face on the machine may be locked against rotation in a pre-selected angular position and the other wedge face rotated with the tool. By these means a bore may be formed with a cranked axis since when both wedge faces rotate together relatively to the work the axis of the bore will be co-incident with said fixed axis while when the tool together with its wedge face is rotated the axis of the bore will be determined by the position of the wedge face on the machine.

Any preselected shape of bore-axis may be effected by rotating the wedge face on the machine at a rate having a predetermined relationship with the rate of traversing movement between the work and tool. Any suitable gear connection may be arranged between the aforesaid control means and said wedge face to achieve the above object.

In the accompanying drawings illustrating alternative methods of carrying out the invention—

Figure 1 is a fragmentary elevation partly in section of the tool and its carrier and the means for supporting them in accordance with the invention;

Figure 2 shows a mechanism for application to the construction of Figure 1 whereby a bore having a varying axis may be machined;

Figure 3 is a similar view to Figure 1 of an alternative arrangement; and

Figure 4 is a fragmentary plan partly in section of a further modified arrangement.

Like numerals indicate like parts throughout the drawings.

In the construction shown in Figure 1, the boring machine is provided with two spaced bearings 2, 2, constituting a head-stock, in which is rotatably mounted a tubular member 3 through which the carrier 4 for the tool 5 extends. The bearings 2, 2 are preferably joined together at their base which base is provided with lugs 55 as shown in Figure 3. The lugs 55 are arranged to slide on a guide bar 56 (see Figure 3) fixed to a fixed part of the machine which carries also the work holder 90. This carrier 4 is supported and guided at each end of the tube 3 in the following manner. On the end of the carrier adjacent the tool is fixed a pair of truncated cone-shaped members 6 and 7, respectively, arranged end-to-end with their smaller diameters abutting one another. These members constitute wedge faces as referred to at the commencement of the specification, the member 7, which is nearer the tool, being formed integrally with the carrier. These cones are similar and their axes are coincident, the cone 6 being separately formed and afterwards fixed to the carrier. Intermediate the tubular member 3 and the cones 6 and 7 and surrounding the latter is a guide member 8 for the carrier. This is a sleeve the inner periphery of which is constituted by a pair of coned bearing surfaces 9 and 10, the axis of one, for example, that at 9, being slightly eccentric to that of the other and to that of the hole to be bored. Normally the cone 7 is supported by the coned surface 10.

The opposite end of the carrier is provided with a single member 11 having two coned surfaces 12 and 13 formed thereon with their axes coincident, the bases of the cones being adjacent one another. The outer cone 12 is normally supported in a coaxially coned seating 14 formed in a sleeve 15 located in an axial recess 16 in the tubular member 3, and beyond the recess the interior of the member 3 is formed with a coned surface 17 surrounding the cone 13. The axis of the two female conical seatings 14 and 17 are not, however, coincident, but coincide respectively with those of the outer and inner bearing surfaces 10 and 9 of the sleeve 8 at the other end of the carrier.

By this arrangement, therefore, when the carrier 4 is moved axially one way to effect the feed of the tool, i. e. in the direction of the arrow X, the first part of the movement causes the cones 7 and 12 first to move from their seatings and the eccentric pair of female conical seatings 9 and 17 is then engaged by the cones 6 and 13 respectively, thus imparting a limited lateral movement to the tool before it engages the work; continued movement of the carrier 4 causes the bearings and the lugs 55 to move axially along the guide bar 56 and the tool will be carried into engagement with the work on the work holder 90 and will machine a parallel bore.

When this operation is finished and the tool is moved in the opposite direction to withdraw it from the work the first part of the movement causes the cones 6 and 13 to be disengaged from the eccentric seatings, the concentric pair of guides 10 and 14 being simultaneously engaged by the cones 7 and 12 so that the axis of the tool, and therefore the cutters 18 thereon, are moved laterally away from the machined surface of the work. Continued movement causes the tool to be withdrawn axially from the work.

Obviously all the female conical seatings 9, 10, 14 and 17 may be formed with their axes coincident, in which case the inner pair of cone-shaped members 6 and 13 would be eccentric to the outer ones.

In order to vary the position of the axis of the tool radially to adjust the diameter of cut, an eccentric mounting may be provided for it in the tool carrier.

The part of the latter which actually receives the tool 5 is constituted by a portion 19 projecting beyond the end of the tubular member 3, and it has a concentric bore 20 in which is rotatably mounted an eccentric sleeve 21 provided at its outer end with a circumferential flange 22 in which are a number of radial holes 23.

The shoulder 24 formed by this flange is adapted to abut the end of the projecting part 19.

In the bore of the eccentric sleeve 21 is mounted a bush 25 having an eccentric and tapering bore 26 wherein the tool 5 is fixed, the outer end of the bush being provided with a circumferential flange 27 which engages the outer surface of that on the eccentric sleeve 21. To prevent rotation of the bush 25 the inner end is formed with diametrically opposite longitudinal slots 28 engaged by a transverse pin 29 extending through the carrier.

An apertured cap 30 extends over the outer end of the bush and is screwed on to the projecting portion 19, and a slot 31 in the side wall of the cap renders the engagement between the end 19 and the flange 22 visible and also provides accessibility to the radial holes 23 in the latter.

Graduations are made on the periphery of the projecting portion 19 and that of the sleeve flange 22 adjacent the engagement, providing a ready means for determining the radial position of the axis of the tool.

Thus by inserting a tommy bar into one or more of the radial holes 23 and rotating the sleeve one way or the other the radial position of the axis of the tool can be quickly altered and its position known.

Relative rotation between the conical seatings and the coned surfaces on the tool carrier is prevented by means of axially extending pins 79 which are secured to the tubular member and slidably engage with holes in a flange 77 attached to the tool carrier by a set screw 78.

In Figure 2 the rotatable tubular member 3 extends out beyond the outer face of the bearing 2 and has a clutch member 80 slidably keyed upon it. A driving pulley 81 is slidably keyed upon the extremity of the tool carrier 4 and is maintained at a fixed distance from the bearing 2 by means not shown. The said clutch member is provided with dog teeth 82 which are arranged to engage similar teeth 83 on the pulley and it is normally maintained in engagement with the pulley by means of a spring 84. In this position of the clutch the tubular member 3 and the tool carrier 4 are rotated solidly together as described in connection with Figure 1. The clutch member is also provided with a friction face 85 which may be engaged with another friction face 86 on the bearing by means of a cam 87. The function of the cam is to disengage the dog clutch against the action of the spring and to force the friction faces into engagement. Before, however, the frictional engagement is established and when the dog clutch is disengaged, the clutch member 80 may be rotated by hand so that the coned surfaces 9 and 10, 14 and 17 are rotated to bring the axis of the tool into a required position in relation to the work. When the friction faces are engaged the rotation of the pulley 81 causes the carrier and tool alone to be rotated about the selected axis. The position of the axis of the bore formed in the work may thus be modified by altering the angular position of the clutch member in relation to the bearing 2.

In an alternative arrangement shown in Figure 3, the cones on the carrier are replaced by parallel-sided portions 32 and 33, the axes of which are inclined to that of the carrier and of the bore to be machined in the work. Both members 32 and 33 are inclined in the same direction and are supported in correspondingly inclined guide surfaces 34 and 35, respectively, which are formed in sleeves 36 and 37 fixed in the rotating tubular member 3.

These inclined guide surfaces 34 and 35 are longer than the coacting parts on the carrier so that endwise movement of the latter in these guides is possible.

It will be seen that a lateral movement of the tool 5 will be effected by moving the carrier 4 endwise, the amount of such movement being determined by the inclination of the guide surfaces 34 and 35 and the axial movement of the carrier.

In this construction the movement of the carrier itself in the direction for cutting is limited by an adjustable stop which is also combined with means for varying the diameter of cut of the tool and is carried out as follows:—

The end of the tubular member 3 remote from the tool is formed with a reduced extension 38 the outer surface of which is screw-threaded at 39 and has a bore 40 through which the carrier 4 extends with clearance. On to the threaded part is screwed a collar 41 having a radial flange 42 extending around its inner periphery. Longitudinal slits 43 are formed in the collar 41 and the outer periphery is tapered and screw-threaded at 44 for a locking nut 45. The radial flange 42 is located with endwise clearance in a circumferential groove constituted by a flanged bush 46 and a ring 47 screwed on the carrier. In the inoperative position of the boring tool the inner side 48 of the circumferential groove abuts the adjacent face of the flange 42 and the endwise clearance is between the opposite face of the flange 42 and the ring 47.

The controlling mechanism for moving the carrier consists of a lever 49 operatively connected at 50 to the end of the carrier and pivoted at 51 intermediate its length to some stationary part of the machine. The opposite end 52 of the lever is controlled by a cam 53 to give the necessary axial movement to the carrier.

Movement of the lever in the direction for the boring operation, i. e. in the direction of the arrow Y, first moves the carrier endwise until the clearance between the ring 47 and the flange 42 has been taken up, and at the same time causes the tool 5 to be moved laterally outwards into a position ready for cutting, after which further movement of the lever produces axial feeding movement only of the tool.

After the boring operation is finished, opposite endwise movement of the carrier automatically moves it laterally inwards, such movement continuing until the inner side 48 of the circumferential groove engages the adjacent face of the flange 42, when the tool can then be withdrawn endwise from the work without injuring the machined surface.

The end of the lever 52 is maintained in contact with the cam 53 by means not shown.

The tubular member 3 is rotatably mounted, as in the previous construction, in a pair of spaced bearings 2, and the periphery 54 of the member between these bearings may form a pulley by which it is rotated.

These spaced bearings 2 are joined together at their bases and formed with lugs 55 which are coaxially bored to slide on a guide bar 56 attached to the machine.

When it is required to increase the diameter of cut of the tool, the locking nut 45 on the tapered periphery 44 of the collar is slacked off and the collar 41 is rotated a predetermined amount so that after it has engaged the face 48 it draws towards it the bearing member 3 together with the sleeves 36 and 37. The movement between these sleeves and the inclined portions 32 of the tool carrier cause the latter to be moved laterally. The collar 41 may be graduated and co-operate with an index or scale not shown and this arrangement constitutes a micrometer mechanism hereinafter referred to in the claims.

By running up the collar 41 as above mentioned, the flange 42 engages the inner side 48 of the circumferential groove and moves the carrier 4 both axially and laterally the desired amount owing to the inclined surfaces on the spindle and the sleeves.

Obviously it is not essential that the parallel sided members 33 and 34 should be cylindrical as they could be of square or any other suitable cross-section.

The previous constructions are suitable for arrangement in which the work is held stationary whilst the tool, during the boring operation is fed axially, but the converse arrangement may be adopted, an arrangement for this purpose being shown in Figure 4.

In this the tool carrier 4 is provided with inclined portions 32 and 33 co-operating with inclined guides 34 and 35 to effect the lateral movement of the tool, and these inclined guides are fixed in the rotatable tubular member 3, all as in Figure 3. The bearings 57 supporting this tubular member may be maintained stationary.

The carrier is so rotatably mounted as to have a limited axial movement which automatically produces the lateral movement and which is effected prior to the commencement of the boring operation and on the relative endwise movement for withdrawal between the work and tool after the boring operation.

In the arrangement shown in Figure 4, the end of the carrier remote from the tool is threaded at 58 for engagement with a flanged collar 59 to which it can be locked in a desired position, as by the coned axial screw 60. The flanged collar 59 is fixed in a sleeve 61 provided with trunnion bearings 62 which are engaged by the forked ends 63 of a lever (not shown) similar to that at 49 in Figure 3, and on the outermost end of the collar 59 is fixed a knurled knob 64. The knob may also carry graduations which cooperate with an index or scale and thus constitute a micrometer mechanism as referred to in connection with Figure 3. On the end of the tubular member 3, adjacent these foregoing parts, is fixed a tubular extension 65 which terminates at its free end in an inward radial flange 66 and the outer periphery of which is formed with splines or keyways 67 adapted to be engaged by corresponding splines or keys 68 attached to the inner periphery of the sleeve 61.

Between the flange 66 and an abutment 69 on the carrier is interposed a compression spring 70 which always tends to thrust the carrier and tool in the direction of the arrow Z. The extent of this axial movement is limited by the end face 71 of the flanged collar abutting the adjacent end face 72 of the extension 65, the tool being then in its cutting position, having been moved laterally slightly due to the inclined portions travelling up their corresponding guides. After the cutting operation the lever ends 63 are moved slightly in the direction opposite to the arrow Z by means, not shown, (such as the cam 53 in Figure 3) and consequently the carrier is moved a corresponding amount axially, automatically withdrawing the cutters 18 laterally from the machined surface of the work.

By releasing the screw 60 the knurled knob can be turned so as to vary the normal position of the inclined portions 32 and 33 in their guides and therefore the effective cutting diameter of the tool, whilst further means for effecting this are also provided in the tool mounting itself and are substantially the same as those in the previous arrangements.

It is to be understood that the feeding and withdrawal of the work is arranged to be carried out in synchronism with the operation of the cam to produce the desired result.

I claim:—

1. A boring machine comprising in combination a head-stock, a cutter-holder movably mounted therein, a wedge face fixed to the cutter-holder and comprising two external conical faces of equal conicity arranged with their larger diameters adjacent, a wedge face mounted in said head-stock and comprising two internal conical faces of equal conicity to one another and to the first said conical faces with which they are arranged to co-operate, which second conical faces are eccentric to the first said faces and are formed on a cylindrical member rotatably mounted in the head-stock, means for rotating said cutter-holder relatively to the head-stock, and means for effecting relative movement between said cutter-holder and head-stock in the direction of the axis of rotation.

2. In a boring machine, a head-stock comprising a plurality of bearings, a sleeve rotatably mounted in said bearings, a driven pulley on said sleeve, a bar connecting said bearings, co-axially bored lugs on said bar, a guide bar adapted to receive said lugs, a spindle movably mounted in said sleeve, guide ways in said sleeve having their surfaces inclined to the axis of the spindle, co-operating members on said spindle adapted to be moved in said guide ways, means for moving said spindle axially in the sleeve whereby the spindle is laterally adjusted, means for driving said pulley, and means for moving the spindle and sleeve together along the axis of the spindle in its laterally adjusted position.

3. In a boring machine, a base having a guide way, a head-stock having a plurality of bearings, translatable along said guide way, a sleeve rotatably mounted in said bearings, a spindle movably mounted in said sleeve, guide ways in said sleeve having their surfaces inclined to the axis of the spindle, co-operating members on said spindle adapted to be moved in said guide ways, means for moving said spindle axially in the sleeve, whereby the spindle is laterally adjusted, means for rotating said sleeve, and means for moving the spindle and sleeve together along the axis of the spindle in its laterally adjusted position.

4. A boring machine comprising in combination a head-stock, a sleeve rotatably mounted in said head-stock, a tool spindle movably mounted therein, a work-holder, means effecting relative rotation between said tool spindle and work-holder, means for effecting relative axial movement between said tool spindle and work-holder, guide means provided with inclined surfaces arranged between said tool spindle and said sleeve, means for moving said tool spindle axially in said sleeve, whereby said guide means effect lateral movement of the tool spindle towards and away from said axis.

5. A boring machine comprising in combination a head-stock, a tool spindle movably mounted therein, a work-holder, means for effecting relative rotation between said tool spindle and work-holder, means for effecting relative axial movement between said tool spindle and work-holder, guide means provided with inclined surfaces arranged between said head-stock and said tool spindle, micrometer adjusting means for effecting movement between said guide means whereby said tool spindle may be moved towards or away from the axis of said rotation, and means for automatically effecting relative axial movement between the said guide means at the commencement and end of the relative axial movement between said tool spindle and work-holder.

6. A boring machine comprising in combination a head-stock, a sleeve rotatably mounted in said headstock, a tool spindle movably mounted therein, a work-holder, means for effecting relative rotation between said tool spindle and work-holder, means for effecting relative axial movement between said tool spindle and workholder, guide means provided with surfaces having a small angle of inclination arranged between said tool spindle and said sleeve, means for moving said tool spindle in said sleeve in the direction of the axis of rotation before commencement and at the completion of a cutting stroke, whereby said guide means effect movement of the tool spindle towards and away from said axis.

7. A boring machine comprising in combination a head-stock, a sleeve rotatably mounted in said headstock, a tool spindle movably mounted therein, a work-holder, means for effecting relative rotation between said tool spindle and work-holder, cooperating guide means provided with inclined surfaces arranged between said tool spindle and said sleeve, a common control means for automatically effecting in succession movement of the tool spindle in said sleeve before the commencement and at the completion of a cutting stroke in the direction of the axis of rotation whereby said guide means effect movement of the tool spindle towards and away from said axis and subsequently for effecting relative movement between the workholder and both head-stock and tool spindle also in direction of said axis for traversing the tool along the work.

8. A boring machine comprising in combination a head-stock, a tool spindle rotatably mounted thereon, guide means fixed to said tool spindle, and having two pairs of concentric conical faces of equal conicity, a cooperating guide sleeve rotatably mounted in said headstock and having two pairs of conical bores of equal conicity to one another and to said conical faces with which they are arranged to cooperate, one of each pair of the conical bores being eccentric to its adjacent conical bore, means for rotating said tool spindle relatively to said headstock, means for effecting relative axial movement between said tool spindle and work-holder, means for automatically effecting relative movement between said tool spindle and headstock in the direction of the axis of rotation before commencement and at the completion of a cutting stroke whereby said guide means effect movement of the tool spindle toward and away from said axis, and means for effecting relative movement between the work-holder and both the head-stock in combination.

9. A boring machine comprising in combination a head-stock, a tool spindle movably mounted thereon, guide means fixed to said tool spindle, and having two pair of concentric conical faces of equal conicity, a cooperating guide sleeve rotatably mounted in said head stock and having two pair of conical bores of equal conicity to one another and to said conical faces with which they are arranged to cooperate, one of each pair of the conical bores being eccentric to its adjacent conical bore, means for rotating said tool spindle and said sleeve relatively to said head-stock, means for effecting relative axial movement between said tool spindle and head-stock in the direction of the axis of rotation, before commencement and at completion of a cutting stroke.

10. A boring machine comprising in combination a head-stock, a tool spindle movably mounted therein, guide means fixed to said tool spindle and having two pair of concentric conical faces of equal conicity, a co-operating guide sleeve rotatably mounted in said headstock and having two pair of conical bores of equal conicity to one another and to said conical faces with which they are arranged to cooperate, one of each pair of the conical bores being eccentric to its adjacent conical bore, means for rotating said tool spindle relatively to said head-stock, means for effecting relative movement between said tool spindle and head-stock in the direction of the axis of rotation, and means for rotating said sleeve at a pre-selected rate of relation to the rate of relative axial movement between the tool spindle and the head-stock.

11. A boring machine comprising in combination a head-stock, a tool spindle movably mounted therein, guide means fixed to the tool spindle and having two pair of concentric conical faces, a cooperating guide sleeve rotatably mounted in said head-stock and having two pair of conical bores of corresponding conicity to those of the tool spindle with which they are arranged to co-operate, one of each pair of said conical bores being eccentric to its adjacent conical bore, means for rotating said tool spindle relatively to the head-stock, and means for automatically effecting relative movement between said tool spindle and headstock in the direction of the axis of rotation before commencement of and at the completion of the cutting stroke.

12. For a boring machine having a tool with a radial cutter, the combination of a headstock movably mounted on the machine in the direction of the axis of the hole to be bored, two rotatable sleeves spaced apart in said head-stock and comprising internal cylindrical faces inclined to said axis, and external cylindrical faces coaxial with said axis, a tool spindle having two inclined cylindrical portions for co-operating with said internal faces, and means for effecting at the commencement and end of the cutting stroke first a limited axial movement between said tool spindle and head-stock and subsequently a movement between said head-stock and the boring machine.

HERBERT JOSEPH LONGLEY.